United States Patent
Lin et al.

(10) Patent No.: US 11,586,504 B2
(45) Date of Patent: Feb. 21, 2023

(54) ELECTRONIC APPARATUS AND BOOT METHOD THEREOF

(71) Applicants: Shang-Heng Lin, Taipei (TW);
Pi-Chiang Lin, Hsinchu (TW);
Chao-An Chang, New Taipei (TW)

(72) Inventors: Shang-Heng Lin, Taipei (TW);
Pi-Chiang Lin, Hsinchu (TW);
Chao-An Chang, New Taipei (TW)

(73) Assignee: ITE Tech. Inc., Hsinchu (TW)

( * ) Notice: Subject to any disclaimer, the term of this patent is extended or adjusted under 35 U.S.C. 154(b) by 16 days.

(21) Appl. No.: 17/195,664

(22) Filed: Mar. 9, 2021

(65) Prior Publication Data

US 2022/0179746 A1   Jun. 9, 2022

(30) Foreign Application Priority Data

Dec. 3, 2020   (TW) .................... 109142670

(51) Int. Cl.
*G06F 11/14*     (2006.01)
*G06F 11/07*     (2006.01)
(Continued)

(52) U.S. Cl.
CPC ........ *G06F 11/1417* (2013.01); *G06F 9/4406* (2013.01); *G06F 9/44505* (2013.01);
(Continued)

(58) Field of Classification Search
CPC ............. G06F 11/1417; G06F 11/3688; G06F 11/3692; G06F 11/1469; G06F 11/0706
See application file for complete search history.

(56) References Cited

U.S. PATENT DOCUMENTS 9,542,195 B1 *   1/2017   Astarabadi .......... G06F 11/1469
10,402,189 B2 *   9/2019   Chang .................... G06F 1/3209
(Continued)

FOREIGN PATENT DOCUMENTS

TW    201933093    8/2019
TW    201937367    9/2019

OTHER PUBLICATIONS

"Office Action of Taiwan Counterpart Application", dated Sep. 3, 2021, p. 1-p. 6.

*Primary Examiner* — Kamini B Patel
(74) *Attorney, Agent, or Firm* — JCIPRNET

(57) ABSTRACT

An electronic apparatus and a boot method thereof are provided. The electronic apparatus includes a first controller, a basic input output system (BIOS), and a second controller. The first controller is configured to receive a boot code and provides the boot code to the electronic apparatus for performing a boot operation. The BIOS is configured to provide the boot code. The second controller has at least one communication interface. The at least one communication interface is configured to be connected to at least one external apparatus. The at least one external apparatus provides a backup boot code to the second controller. When the boot operation performed by the electronic apparatus according to the boot code provided by the BIOS fails, the second controller replaces the first controller to receive the backup boot code and provides the backup boot code to enable the electronic apparatus to perform the boot operation.

10 Claims, 3 Drawing Sheets

(51) Int. Cl.
*G06F 9/445* (2018.01)
*G06F 11/36* (2006.01)
*G06F 9/4401* (2018.01)

(52) U.S. Cl.
CPC ...... *G06F 11/0772* (2013.01); *G06F 11/3688* (2013.01); *G06F 11/3692* (2013.01)

(56) References Cited

U.S. PATENT DOCUMENTS

| | | | | |
|---|---|---|---|---|
| 2004/0153724 | A1* | 8/2004 | Nicholson | G06F 11/0709 |
| | | | | 714/E11.133 |
| 2009/0271660 | A1* | 10/2009 | Chin | G06F 11/0757 |
| | | | | 714/15 |
| 2009/0276616 | A1* | 11/2009 | Wang | G06F 11/0724 |
| | | | | 713/2 |
| 2015/0143095 | A1* | 5/2015 | Maity | G06F 11/1417 |
| | | | | 713/2 |
| 2015/0143172 | A1* | 5/2015 | Huang | G06F 11/2284 |
| | | | | 714/15 |
| 2018/0088962 | A1* | 3/2018 | Balakrishnan | G06F 11/0757 |
| 2018/0335980 | A1* | 11/2018 | Chang | G11C 16/10 |
| 2019/0227783 | A1* | 7/2019 | Chang | G06F 21/64 |
| 2021/0157921 | A1* | 5/2021 | Brown | G06F 21/575 |
| 2021/0240488 | A1* | 8/2021 | Suryanarayana | G06F 9/4406 |

* cited by examiner

ELECTRONIC APPARATUS AND BOOT METHOD THEREOF

CROSS-REFERENCE TO RELATED APPLICATION

This application claims the priority benefit of Taiwan application no. 109142670, filed on Dec. 3, 2020. The entirety of the above-mentioned patent application is hereby incorporated by reference herein and made a part of this specification.

BACKGROUND

Technical Field

The disclosure relates to an electronic apparatus and a boot method thereof, and in particular, to an electronic apparatus and a boot method thereof capable of providing assistance in a boot operation through external data.

Description of Related Art

At present, in an electronic apparatus, content of a firmware program is stored most of the time by implementing a read-only memory of a basic input/output system (BIOS). Nevertheless, once the read-only memory acting as the BIOS of the electronic apparatus is damaged, the electronic apparatus may not read a correct firmware boot code and thus may not be normally activated.

In the related art, a redundant read-only memory is disposed on the motherboard most of the time to provide a backup firmware boot code. Product costs, however, may increase in this way. Further, the read-only memory acting as the backup may be damaged, too. As such, the electronic apparatus is not ensured to be booted normally.

SUMMARY

The disclosure provides an electronic apparatus and a boot method thereof capable of ensuring an effective boot operation performed by the electronic apparatus.

The disclosure provides an electronic apparatus including a first controller, a basic input/output system (BIOS), and a second controller. The first controller is configured to receive a boot code and provides the boot code to enable the electronic apparatus to perform a boot operation. The BIOS is coupled to the first controller and is configured to provide a boot code. The second controller is coupled to the first controller. The second controller has at least one communication interface. The at least one communication interface is configured to be connected to at least one external apparatus. The at least one external apparatus provides a backup boot code to the second controller. When the boot operation performed by the electronic apparatus according to the boot code provided by the BIOS fails, the second controller replaces the first controller to receive the backup boot code and provides the backup boot code to enable the electronic apparatus to perform the boot operation.

The disclosure further provides a boot method including the following steps. A first controller is provided to receive a boot code via a basic input/output system (BIOS). A second controller is provided to be connected to at least one external apparatus through at least one communication interface, and the at least one external apparatus provides a backup boot code. The boot code is provided to enable the electronic apparatus to perform a first boot operation. When the first boot operation fails, the second controller replaces the first controller to receive the backup boot code. The backup boot code is provided to enable the electronic apparatus to perform a second boot operation.

Based on the above, in the embodiments of the disclosure, when the boot operation performed by the electronic apparatus according to the boot code provided by the BIOS fails, the boot operation may be performed through the backup boot code provided by the external electronic apparatus through controller replacement. In the embodiments of the disclosure, a redundant electronic device for storing the backup boot code is not required to be disposed in the electronic apparatus, and further, the electronic apparatus is ensured to successfully perform the boot operation without an increase in hardware costs.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
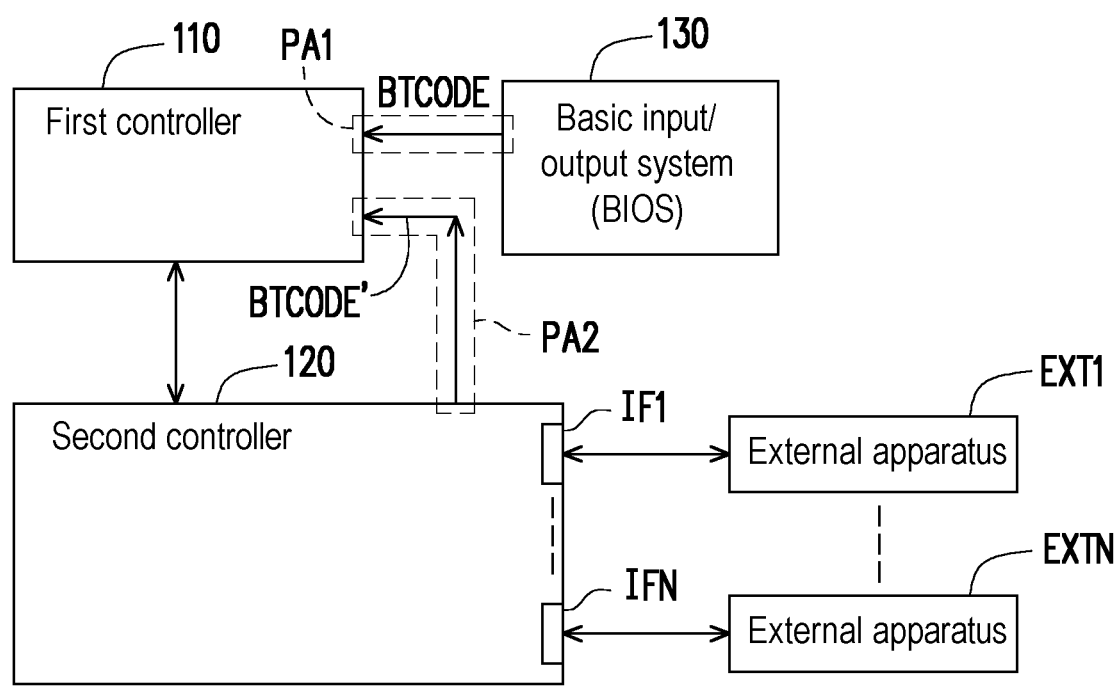
FIG. 1 is a schematic diagram illustrating an electronic apparatus according to an embodiment of the disclosure.

Referring to FIG. 1, FIG. 1 is a schematic diagram illustrating an electronic apparatus according to an embodiment of the disclosure. An electronic apparatus 100 includes a first controller 110, a second controller 120, and a basic input/output system (BIOS) 130. The first controller 110 is configured to receive a boot code BTCODE and provides the boot code BTCODE to enable the electronic apparatus 100 to perform a boot operation. The BIOS 130 is coupled to the first controller 110. A first transmission path PA1 may be formed between the BIOS 130 and the first controller 110. The BIOS 130 may provide the boot code BTCODE to the first controller 110 through the first transmission path PA1. The electronic apparatus 100 may perform the boot operation according to the boot code BTCODE.

The second controller 120 is coupled to the first controller 110. The second controller 120 has one or a plurality of communication interfaces IF1 to IFN. The communication interfaces IF1 to IFN are configured to be connected to external apparatuses EXT1 to EXTN, respectively. At least one of the external apparatuses EXT1 to EXTN may provide a backup boot code BTCODE' to the second controller 120. A second transmission path PA2 may be formed between the second controller 120 and the first controller 120, and the second controller 120 may transmit the backup boot code BTCODE' to the first controller 110 through the second transmission path PA2. In this way, the electronic apparatus 100 may perform the boot operation according to the backup boot code BTCODE'.

Regarding operation details, in an initial state, the first controller 110 may first enable the first transmission path PA1 to be connected and the second transmission path PA2 to be cut off. Next, the first controller 110 may read the boot code BTCODE via the BIOS 130 through the first transmission path PA1. The first controller 110 enables the electronic apparatus 100 to perform a first boot operation according to the read boot code BTCODE.

After the first boot operation, the electronic apparatus 100 may perform one or a plurality of boot test procedures, and read a response signal generated corresponding to the boot test procedure(s) in a predetermined time interval after the boot test procedure(s) is/are performed to determine whether the first boot operation is successful. In detail, for example, a watch dog timer mechanism may be disposed to check whether the response signal generated corresponding to the boot test procedure(s) is successfully returned in the predetermined time interval. If yes is determined, it means that the first boot operation is successful; on the contrary, if no is determined, it means that the first boot operation fails.

In this embodiment, when an error occurs in the boot code BTCODE provided by the BIOS 130, the first boot operation of the electronic apparatus 100 may fail. When the first boot operation of the electronic apparatus 100 is determined to be failed, the first controller 110 cuts off the first transmission path PA1 and connects the second transmission path PA2. The first controller 110 communicates with the second controller 120 through the second transmission path PA2. The second controller 120 further enables the connected external apparatus (one of the external apparatuses EXT1 to EXTN, for example, the external apparatus EXT1) to simulate the BIOS 130. Then, the second controller 120 reads the backup boot code BTCODE' stored in the external apparatus EXT1 and provides the backup boot code BTCODE' to the first controller 110 through the second transmission path PA2. In this way, the first controller 110 may provide the backup boot code BTCODE' to enable the electronic apparatus 100 to perform a second boot operation.

In this embodiment, the first controller 110 may be a platform controller hub (PCH). The second controller 120 may be an embedded controller. The first transmission path PA1 formed between the first controller 110 and the BIOS 130 and the second transmission path PA2 formed between the first controller 110 and the second controller 120 may both be constructed in a format of a serial peripheral interface (SPI). In addition, the communication interfaces IF1 and IF2 on the second controller 120 may be a universal serial bus (USB) interface and a local area network (LAN) communication interface, respectively. Certainly, the second controller 120 may also be connected to the external apparatus through other communication interfaces in a format well known to those skilled in the art, which is not particularly limited.

Incidentally, when more than one external apparatuses are connected to the second controller 120, the second controller 120 may search in data storage areas of the external apparatuses and select the external apparatus having the backup boot code BTCODE' to simulate the BIOS 130. If plural apparatuses are equipped with the backup boot code BTCODE', the second controller 120 may select the external apparatus having a latest version of the backup boot code BTCODE' to simulate the BIOS 130.

Based on the above, it can be seen that when the electronic apparatus 100 cannot be successfully booted according to the boot code BTCODE stored in the BIOS 130, a user may connect a flash drive (the external apparatus EXT1) having the correct backup boot code BTCODE' to the second controller 120 through the communication interface IF1 of the USB. The user may further enable the electronic apparatus 100 to read the backup boot code BTCODE' in the flash drive (the external apparatus EXT1) so as to successfully complete the boot operation in a next boot operation.

Under the above conditions, a redundant memory device is not required to be disposed in the electronic apparatus 100 for storing the backup boot code BTCODE', and product costs may thus be decreased in this embodiment of the disclosure.

Incidentally, after the electronic apparatus 100 successfully enables the second controller 120 to simulate the BIOS 130 and provides the backup boot code BTCODE' for the boot operation, the second controller 120 may simulate a host to perform a firmware repair operation on the boot code BTCODE of the BIOS 130. In this way, when the user performs the next boot operation, the electronic apparatus 100 may complete the boot operation successfully by using the boot code BTCODE provided by the BIOS 130.

Figure 2:
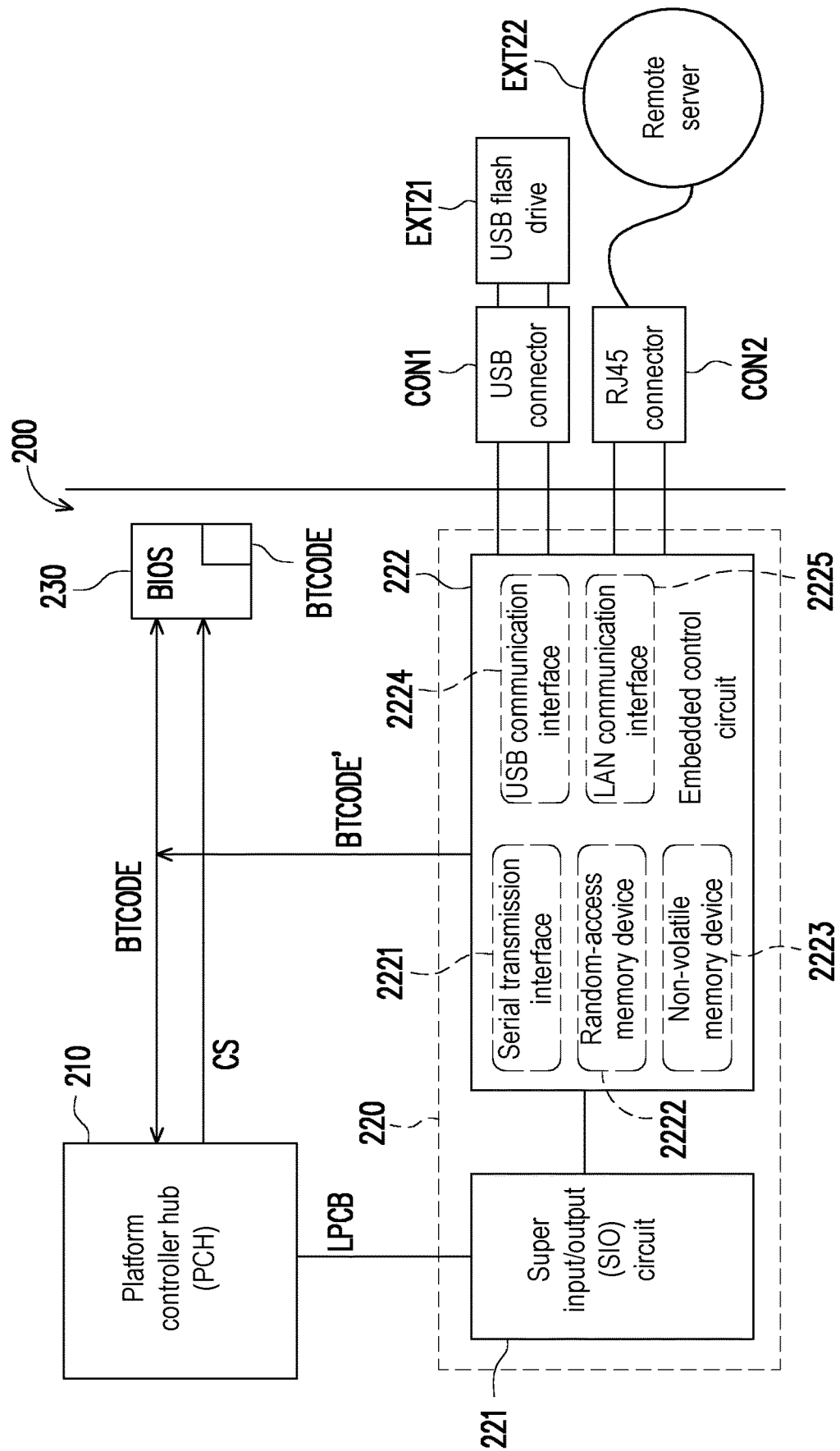
FIG. 2 is a schematic diagram illustrating an electronic apparatus according to another embodiment of the disclosure.

Referring to FIG. 2, FIG. 2 is a schematic diagram illustrating an electronic apparatus according to another embodiment of the disclosure. An electronic apparatus 200 includes a PCH 210 acting as a first controller, a second controller 220, and a BIOS 230. In this embodiment, the second controller 220 further includes a super input/output (SIO) circuit 221 and an embedded control circuit 222. The SIO circuit 221 may be coupled to the PCH 210 through a low pin count bus LPCB and acts as an information transmission path between the PCH 210 and the second controller 220. In addition, the embedded control circuit 222 includes a serial transmission interface 2221, a random-access memory device 2222, a non-volatile memory device 2223, a USB communication interface 2224, and a LAN communication interface 2225.

In the embedded control circuit 222, the serial transmission interface 2221 may be an SPI and may be configured to be connected to the PCH 210. The USB communication interface 2224 and the LAN communication interface 2225 may be coupled to a USB connector CON1 and an RJ45 connector CON2, respectively. The USB connector CON1 and the RJ45 connector CON2 are configured to be connected to external apparatuses such as a USB flash drive EXT21 and a remote server EX22, respectively.

When the electronic apparatus 200 is booted, the PCH 210 may enable the BIOS 230 through a chip enable signal CS and reads the boot code BTCODE acting as a firmware program via the BIOS 230. When the BIOS 230 is enabled according to the chip enable signal CS, a first transmission path between the PCH 210 and the BIOS 230 is in a conducting state. Then, the PCH 210 may provide the boot code BTCODE to enable the electronic apparatus 200 to perform a first boot operation.

If the first boot operation is determined to be a boot failure, the PCH 210 may disable the BIOS 230 through chip enable signal CS and cuts off the first transmission path between the PCH 210 and the BIOS 230. Next, the PCH 210 may enable a second transmission path between the PCH 210 the second controller 220 to be in a conducting state. Through the second transmission path, the PCH 210 may read the backup boot code BTCODE' in the USB flash drive EXT21 through the USB communication interface 2224 and enables the electronic apparatus 200 to perform a second boot operation according to the backup boot code BTCODE'. Alternatively, through the second transmission path, the PCH 210 may also read the backup boot code BTCODE' in the remote server EXT22 through the LAN communication interface 2225 and enables the electronic apparatus 200 to perform the second boot operation according to the backup boot code BTCODE'.

It is to be noted that the backup boot code BTCODE' provided by the external apparatuses may also be pre-stored in the non-volatile memory device 2223 in the embedded control circuit 222. In this embodiment, the non-volatile memory device 2223 may be a flash memory. In this way, when the first boot operation of the electronic apparatus 200 fails, the PCH 210 may enable the electronic apparatus 200 to perform the second boot operation by reading the backup boot code BTCODE' stored in the non-volatile memory device 2223 in the embedded control circuit 222. In this way, the boot operation may be accelerated.

In addition, the random-access memory device 2222 in the embedded control circuit 222 may be a static random-access memory (SRAM) used to store temporary data for a computation operation performed by the embedded control circuit 222.

Based on the above, in the embodiments of the disclosure, the external apparatuses (the USB flash drive EXT21 and the remote server EXT22) connected to the electronic apparatus 200 and the non-volatile memory device 2223 in the embedded control circuit 222 may all provide the backup boot code BTCODE'. Accordingly, the electronic apparatus 200 may not fail to boot due to a damaged BTCODE. In this way, the electronic apparatus 200 is ensured to operate normally without an increase in additional product costs.

Figure 3:
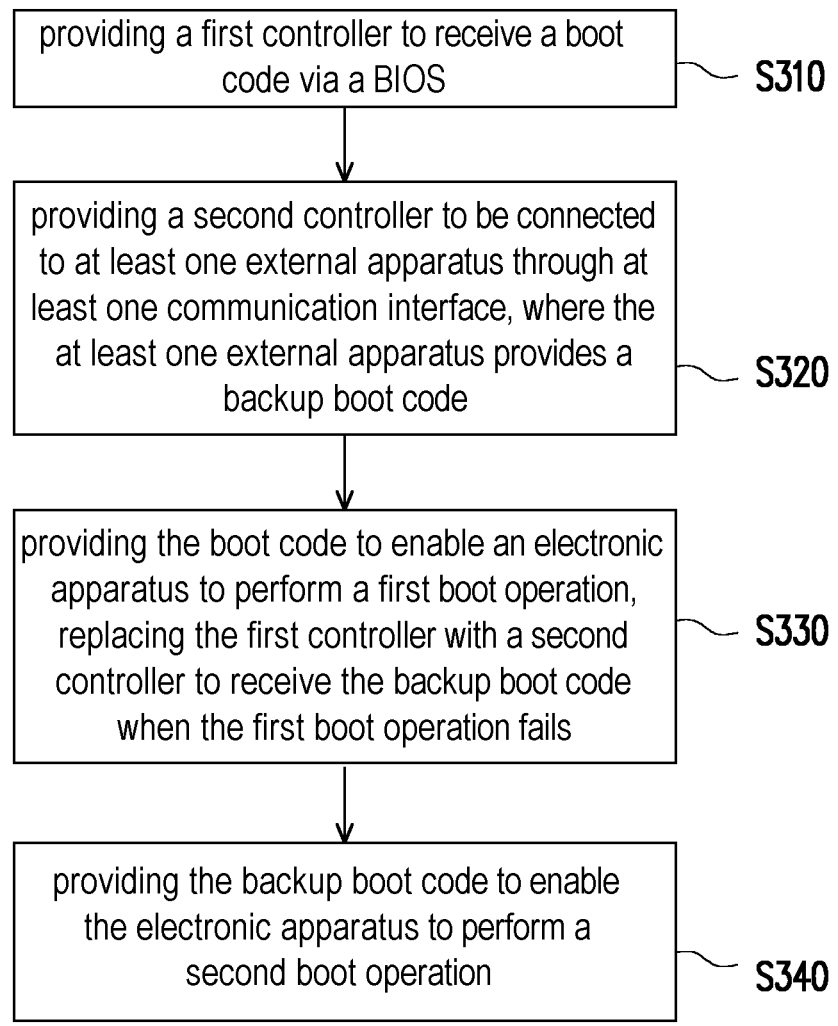
FIG. 3 is a flow chart illustrating a boot operation of an electronic apparatus according to an embodiment of the disclosure.

Referring to FIG. 3, FIG. 3 is a flow chart illustrating a boot operation of an electronic apparatus according to an embodiment of the disclosure. In step S310, a first controller is provided to receive a boot code via a BIOS. In step S320, a second controller is provided to be connected to at least one external apparatus through at least one communication interface, and the at least one external apparatus provides a backup boot code. Next, in step S330, the boot code is provided to enable the electronic apparatus to perform a first boot operation. Further, in step S330, when the first boot operation fails, a second controller replaces the first controller to receive the backup boot code. In step S340, the backup boot code is provided to enable the electronic apparatus to perform a second boot operation.

In this embodiment, the electronic apparatus may be a computer of any form, or any electronic apparatus that needs a boot operation.

The implementation details of steps S310 to S340 in this embodiment are described in detail in the foregoing embodiments and are not be repeated herein.

In view of the foregoing, the electronic apparatus provided by the disclosure may enable the at least one external apparatus to simulate the BIOS. When the boot code provided by the BIOS is damaged, the electronic apparatus may obtain the backup boot code through the at least one external apparatus and performs the boot operation according to the backup boot code. Since the backup boot code may be provided externally, the boot operation or the electronic apparatus is ensured to be successfully executed. In addition, a redundant chip is not required to be disposed for storing the backup boot code in the electronic apparatus provided by the disclosure, and product costs are therefore reduced effectively.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic apparatus, comprising:
    a first controller configured to receive a boot code, providing the boot code to enable the electronic apparatus to perform a boot operation;
    a basic input output system (BIOS), coupled to the first controller, configured to provide the boot code; and
    a second controller, coupled to the first controller, wherein the second controller has at least one communication interface, the at least one communication interface is configured to be connected to at least one external apparatus, and the at least one external apparatus provides a backup boot code to the second controller for enabling the second controller to simulate the basic input output system, wherein the backup boot code is a version of the boot code of the BIOS and stored in the at least one external apparatus,
    wherein when the boot operation performed by the electronic apparatus according to the boot code provided by the basic input/output system fails, the second controller replaces the first controller to receive the backup boot code and provides the backup boot code to enable the electronic apparatus to perform the boot operation,
    wherein a first transmission path is formed between the first controller and the basic input/output system, a second transmission path is formed between the first controller and the second controller, and when the boot operation performed by the electronic apparatus according to the boot code provided by the basic input/output system fails, the first controller cuts off the first transmission path, and the second controller transmits the backup boot code to the first controller through the second transmission path.

2. The electronic apparatus according to claim 1, wherein the second controller comprises:
    an embedded control circuit, coupled to the first controller, receiving the backup boot code through the at least one communication interface, transmitting the backup boot code to the first controller; and
    a super input/output (SIO) circuit, coupled between the first controller and the embedded control circuit.

3. The electronic apparatus according to claim 2, wherein the embedded control circuit comprises:
    a non-volatile memory device, configured to store the backup boot code; and
    a serial transmission interface, coupled to the first controller, configured to transmit the backup boot code.

4. The electronic apparatus according to claim 2, wherein the embedded control circuit further comprises:
    a random-access memory device; and
    the at least one communication interface, comprising at least one of a universal serial bus (USB) interface and a local area network (LAN) communication interface.

5. The electronic apparatus according to claim 1, wherein the electronic apparatus performs at least one boot test procedure and tests whether the boot operation is successful according to at least one response signal corresponding to the at least one boot test procedure in a predetermined time interval.

6. The electronic apparatus according to claim 1, wherein the first controller is a platform controller hub (PCH).

7. The electronic apparatus according to claim 1, wherein after the electronic apparatus is successfully booted according to the backup boot code, the second controller simulates a host and performs a firmware repair operation on the boot code of the basic input/output system.

8. A boot method of an electronic apparatus, comprising:
providing a first controller to receive a boot code via a basic input/output system (BIOS);
providing a second controller to be connected to at least one external apparatus through at least one communication interface, wherein the at least one external apparatus provides a backup boot code to the second controller for enabling the second control to simulate the basic input output system, wherein the backup boot code is a version of the boot code of the BIOS and stored in the at least one external apparatus;
providing the boot code to enable the electronic apparatus to perform a first boot operation;
replacing the first controller with the second controller to receive the backup boot code when the first boot operation fails;
providing the backup boot code to enable the electronic apparatus to perform a second boot operation,
forming a first transmission path between the first controller and the basic input/output system;
cutting off the first transmission path, forming a second transmission path between the first controller and the second controller when the first boot operation fails; and
transmitting the backup boot code by the second controller through the second path.

9. The boot method of the electronic apparatus according to claim 8, further comprising:
performing at least one boot test procedure by the first controller after the first boot operation; and
testing whether the first boot operation is successful according to at least one response signal corresponding to the at least one boot test procedure in a predetermined time interval.

10. The boot method of the electronic apparatus according to claim 8, further comprising:
simulating a host and performing a firmware repair operation on the boot code of the basic input/output system by the second controller after the electronic apparatus is successfully booted according to the backup boot code.

* * * * *